July 5, 1938.    W. H. BISHOP    2,122,712
SLIDING ROOF FOR VEHICLES
Filed Dec. 20, 1935    2 Sheets-Sheet 1

INVENTOR.
William Henry Bishop.
BY
Harness, Dickey, Pierce & Hann.
ATTORNEYS.

July 5, 1938.  W. H. BISHOP  2,122,712
SLIDING ROOF FOR VEHICLES
Filed Dec. 20, 1935  2 Sheets-Sheet 2

INVENTOR.
*William Henry Bishop.*
BY
*Harness, Dickey, Pierce & Hann.*
ATTORNEYS.

Patented July 5, 1938

2,122,712

UNITED STATES PATENT OFFICE 2,122,712

SLIDING ROOF FOR VEHICLES

William Henry Bishop, Birmingham, England

Application December 20, 1935, Serial No. 55,361
In Great Britain August 21, 1935

3 Claims. (Cl. 296—137)

This invention relates to improvements in sliding roofs for vehicles.

It is now common practice to provide in the front part of the roof of a saloon car a rectangular opening adapted to be closed or to be uncovered to any desired extent by a longitudinally movable panel slidable on guides on the roof, the panel in some cases sliding when opened under a canopy forming the rear part of the roof. In the specification of my British Patent No. 405,413 there is described a construction in which the canopy forming the rear part of the roof is itself slidably mounted on guides so that it may slide forwardly to uncover an opening towards the rear part of the roof.

The object of my invention is to provide an improved construction for a sliding roof of this type which greatly facilitates the fitting of the roof, which permits an opening to be uncovered at the front or rear of the roof or at both front and rear according to the wishes of the occupants of the vehicle, which permits effective ventilation of the vehicle to be obtained without draughts, and which is neat and unobtrusive in appearance.

According to my invention a longitudinal opening in a vehicle roof is adapted to be closed by a shallow shell or box slidably mounted on guides at the sides of the opening and by a slidably mounted panel adapted to telescope into the shell or box. Thus the panel can be slid into the shell to uncover one end of the opening, the shell can be slid over the panel to uncover the other end of the opening or both can be telescoped together at the centre of the opening to uncover a space at each end of the opening.

The upper surfaces of the shell and panel are trimmed or otherwise finished to match the roof covering while their under surfaces are trimmed to match the head lining.

Preferably the opening in the roof is defined or surrounded by a skeleton metal tray which is built into the roof and has around its inner edge an upstanding lip with an outwardly directed flange which forms a water-check and may also form the guides for the shell and panel to slide on, outlets being provided to drain from the tray any water which runs into it so that no water can enter the body. The tray with the shell and panel may be supplied as a complete unit ready for building into a roof so that no fitting of the sliding roof has to be done by the coach-builder.

As the shell can be moved forwardly without affecting the panel it can be opened slightly to allow air to enter between its rear edge and the rear end of the opening for ventilation, and if desired a deflector may be provided on the roof at the rear edge of the opening to assist the flow of air.

One practical form of sliding roof in accordance with my invention is illustrated by way of example in the accompanying drawings in which:—

Figure 1:
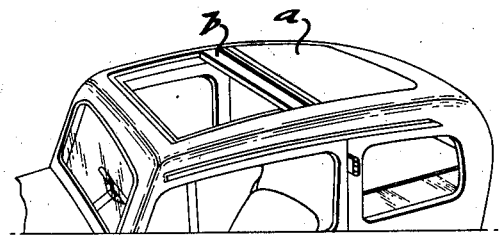
Figures 1 to 4 are perspective views of a vehicle roof embodying my invention, showing four possible positions of the sliding shell and panel.
Figure 2:
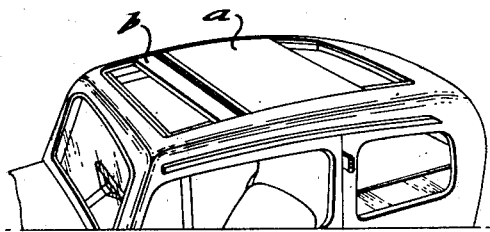
Figure 3:
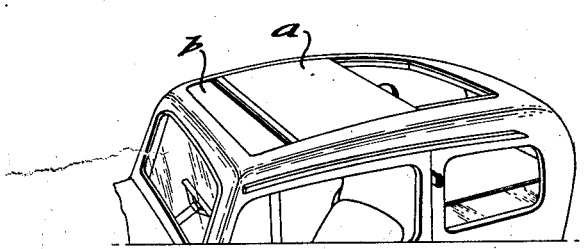
Figure 4:
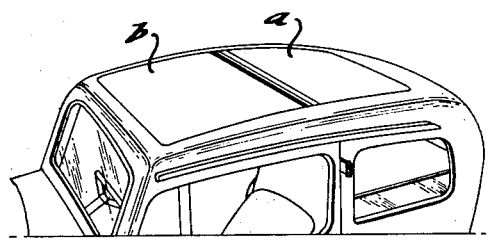

In the construction illustrated a longitudinal opening in a vehicle roof is adapted to be closed by a longitudinally slidable shell $a$ normally lying over the rear part of the opening and a longitudinally slidable panel $b$ normally lying over the front part of the opening and adapted to telescope into the shell $a$. The panel may be slid rearwardly into the shell to uncover the front part of the opening as shown in Figure 1, the panel may be slid rearwardly and the shell forwardly to uncover shorter portions of the opening at the front and rear as shown in Figure 2, the shell may be slid forwardly over the panel to uncover the rear part of the opening as shown in Figure 3, or the opening may be completely closed as shown in Figure 4.

Figure 5:
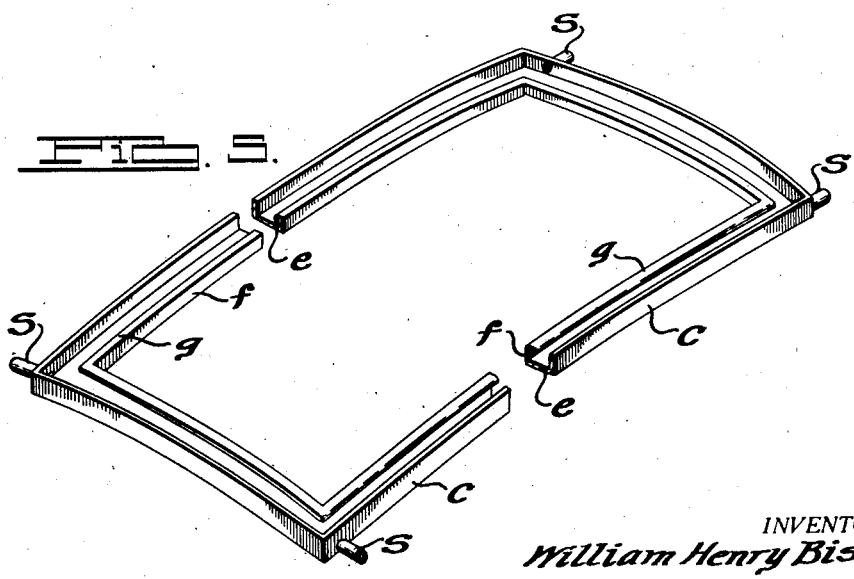
Figure 5 is a perspective view on a larger scale of the skeleton tray which surrounds the opening in the roof.
Figure 8:
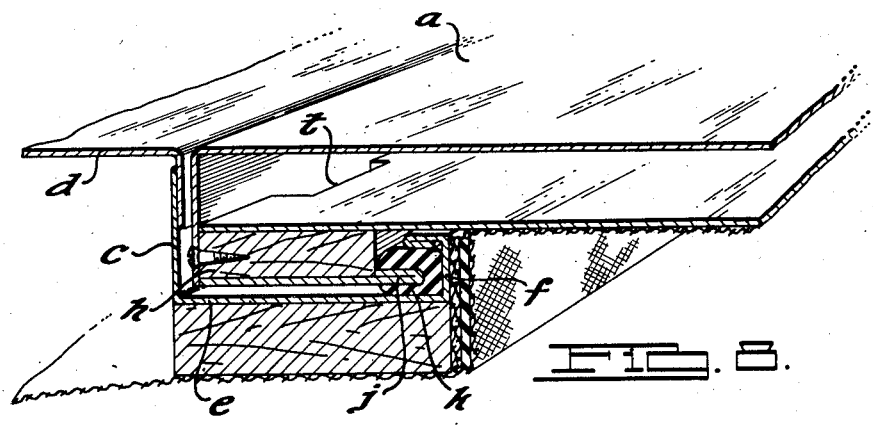
Figure 8 is a fragmentary sectional perspective view of one side edge of the shell showing the way in which it is guided on the tray.
Figure 9:
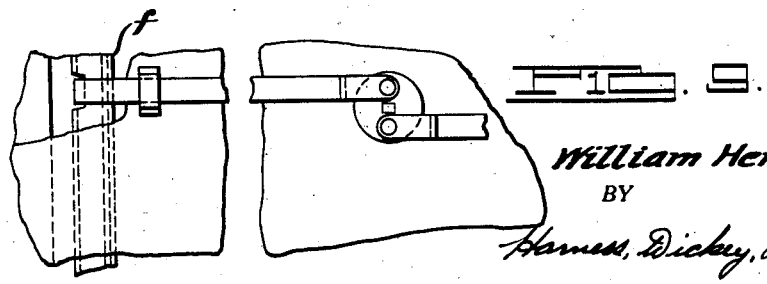
Figure 9 is a fragmentary plan view of the locking mechanism.

The opening in the roof in the construction illustrated is defined or surrounded by the skeleton metal tray shown in Figure 5. This tray has a peripheral vertical wall $c$ adapted to be welded or otherwise secured to the surrounding parts $d$ of the roof as shown in Figure 8, a base $e$ curved to the contour of the roof, an inner upstanding lip $f$ of less depth than the wall $c$, and an outwardly projecting horizontal flange $g$ on the lip $f$ so that a continuous trough or channel is formed between the wall $c$ and the lip $f$.

The shell $a$ is built up from sheet aluminium or other metal in the form of a shallow box of a length slightly greater than half that of the roof opening and of a width very slightly less than that between the side walls c of the tray. A wooden batten h secured to the underside of the shell at each side lies in the side channel of the tray and carries inwardly projecting sheet metal lugs j provided with felt pads k engaging under the flange g on the tray to form guides for the shell.

In an alternative construction the upper surface of the shell may be made of metal while the underside is formed of wood framing covered with fabric.

The panel b is made of aluminium or other metal and its rear edge is provided with felt pads l which are an easy sliding fit in the shell while its front edge is provided at each side with any convenient form of runner engaging the flange g of the tray.

Figure 6:
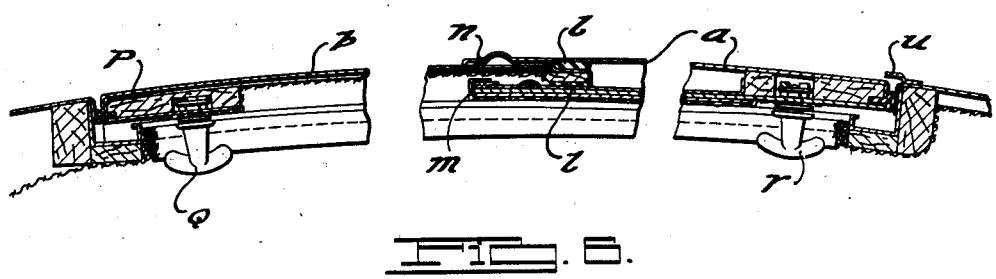
Figure 6 is a longitudinal section of the sliding roof showing the opening closed.
Figure 7:
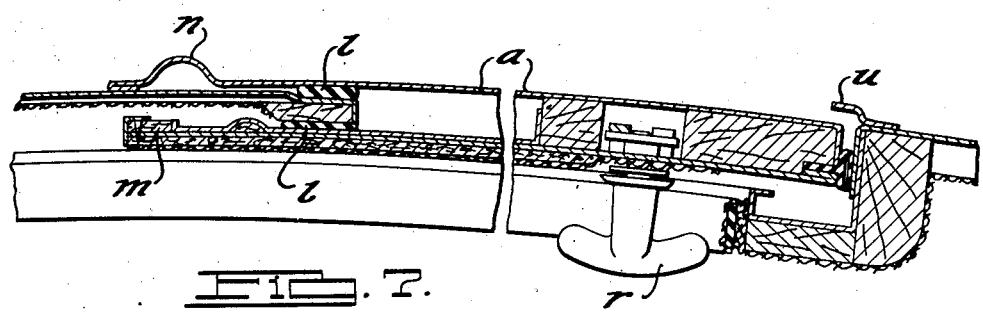
Figure 7 is a fragmentary longitudinal section on a larger scale of the shell and the rear end of the sliding panel.

A transverse strip m is secured across the front edge of the lower surface of the shell a as shown in Figure 6 to make a neat internal joint with the panel while the front edge of the upper surface is flanged or beaded as shown at n to co-operate with the upper surface of the panel.

The undersides of the shell and panel are lined with head cloth or otherwise trimmed to match the interior of the body while their upper surfaces are finished to match the exterior of the roof.

Any convenient means may be fitted adjacent to the front end of the panel and the rear end of the shell for locking these parts in various longitudinal positions in which they may be set.

For example the panel may be provided adjacent to its front edge with a cross-member p in which is mounted a rotatable handle q controlling, by means of laterally extending bars or strips, hooks or catches engaging over the flanges g at the sides of the opening.

Similar hooks or catches for locking the shell in position are operated by a handle r mounted in the shell adjacent to its rear edge.

When the opening is closed in wet weather any water which may find its way between the side edges of the panel and shell and the outer wall of the tray drains into the channel of the tray and is carried off by outlets such as those indicated at s in Figure 5, the flange g forming an effective water-check to prevent any water getting into the body. Some water may be blown over the surface of the panel into the shell and to carry this away openings such as that shown at t in Figure 8 may be provided in the bottom of the shell at each side through which the water can drain into the channel in the tray.

If desired a narrow forwardly curved deflector u (Figure 6) may be secured to the roof at the rear end of the opening and by moving the shell forward for a short distance air flowing over the roof will be deflected between the rear edge of the shell and the tray into the interior of the vehicle. Air can escape under the panel towards the front of the vehicle as indicated by the arrows in Figure 6 so that there is a continuous forward circulation of air in the upper part of the body and effective ventilation is obtained without objectionable draughts.

The tray complete with the shell and panel may be supplied as a unit ready for building into a roof and the coach-builder is thus relieved of any work in connection with the fitting of the sliding roof.

I claim:

1. A roof construction comprising a relatively fixed roof portion having an opening therein; a first sliding panel having upper and lower spaced enclosing surfaces connected together adjacent the lateral edges thereof and adapted to partially close the opening; a second sliding panel for closing another part of the opening and adapted to enter the first panel between the enclosing surfaces in telescoping relation; and guiding members between the panels and the roof portion adapted to enable the first panel to be slid along the roof portion over the second panel and to enable the second panel to be slid along the roof portion into the first panel.

2. A roof construction comprising a relatively fixed roof portion having an opening therein; a first sliding panel having upper and lower spaced enclosing surfaces connected together adjacent the lateral edges thereof and adapted to partially close the opening; a second sliding panel for closing another part of the opening and adapted to enter the first panel between the enclosing surfaces in telescoping relation; guide means connected between the first panel and the roof portion for enabling the first panel to be slid along the roof portion over the second panel; and guide means for the second panel secured in part within and movable with the first panel and in part to the roof portion for enabling the second panel to be slid along the roof portion into the first panel.

3. A roof construction comprising a relatively fixed roof portion having an opening therein; a rectangular frame structure associated with said opening and having a peripheral wall secured to the sides thereof, and an outwardly directed flange spaced inwardly from said peripheral wall; a first sliding panel having upper and lower spaced enclosing surfaces connected together adjacent the lateral edges thereof and adapted to partially close the opening; a second sliding panel for closing another part of the opening and adapted to enter the first panel between the enclosing surfaces in telescoping relation; guide means carried by the first panel and adapted to engage one surface of said flange so as to enable the first panel to be slid along the roof portion over the second panel; and guide means for the second panel adapted to engage in part the interior of the first panel and to engage in part an opposite surface of said flange so as to enable the second panel to be slid along the roof portion into the first panel.

WILLIAM HENRY BISHOP.